US007200090B2

(12) United States Patent
Yamanoi et al.

(10) Patent No.: US 7,200,090 B2
(45) Date of Patent: Apr. 3, 2007

(54) INFORMATION RECORDING APPARATUS INCLUDING INFORMATION ATTACHING AND GENERATING DEVICE WHICH GENERATES GROUP CONTROL INFORMATION

(75) Inventors: Katsuaki Yamanoi, Kawagoe (JP); Tomoyasu Yamada, Kawagoe (JP); Takayuki Iijima, Kawagoe (JP); Shinichiro Abe, Kawagoe (JP); Yoji Shumura, Kawagoe (JP); Tomoko Miyagawa, Kawagoe (JP); Junichi Fukamachi, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 225 days.

(21) Appl. No.: 09/990,372

(22) Filed: Nov. 23, 2001

(65) Prior Publication Data

US 2002/0064116 A1 May 30, 2002

(30) Foreign Application Priority Data

Nov. 24, 2000 (JP) ............................ P2000-357769
Nov. 24, 2000 (JP) ............................ P2000-357772
Nov. 24, 2000 (JP) ............................ P2000-357773

(51) Int. Cl.
*G11B 21/08* (2006.01)
*G06F 12/00* (2006.01)

(52) U.S. Cl. ............................ 369/53.37; 369/30.05; 369/30.07; 369/30.08; 711/712

(58) Field of Classification Search ............. 369/53.37, 369/59.25, 30.05, 30.07, 30.08; 711/712; *G11B 7/0045, G11B 21/08, 7/085; G06F 12/00*
See application file for complete search history.

(56) References Cited

U.S. PATENT DOCUMENTS 5,224,087 A * 6/1993 Maeda et al. ............. 369/53.12

(Continued)

FOREIGN PATENT DOCUMENTS

JP 10-336579 * 12/1998

(Continued)

OTHER PUBLICATIONS

MAT (Machine assisted translation) of JP 10-336579.*

*Primary Examiner*—A M Psitos
(74) *Attorney, Agent, or Firm*—Drinker Biddle & Reath LLP

(57) ABSTRACT

When a detection device detects any kind of change regarding track recording after the start of the track recording, a grouping instruction is given to information attaching and generating device. Then, the information attaching and generating device attaches the same group name information to a group, in which a track where the recording has been started in an information recording medium to a track recorded at the point when the grouping instruction has been received are made to be the same group, and group control information is generated. Therefore, since the grouping is automatically performed by any kind of change regarding the track recording, a user can omit the operation that he/she performs the grouping by himself/herself, and thus the operation load of the user can be reduced.

22 Claims, 9 Drawing Sheets

U.S. PATENT DOCUMENTS

| | | | |
|---|---|---|---|
| 5,303,218 A * | 4/1994 | Miyake | 369/47.2 |
| 5,619,483 A | 4/1997 | Yokota et al. | 369/47 |
| 5,987,417 A * | 11/1999 | Heo et al. | 704/500 |
| 6,148,140 A * | 11/2000 | Okada et al. | 386/105 |
| 6,188,662 B1 * | 2/2001 | Maeda et al. | 369/83 |
| 6,226,441 B1 * | 5/2001 | Hartung et al. | 386/46 |
| 6,362,928 B2 * | 3/2002 | Hamai et al. | 360/48 |
| 6,477,313 B1 * | 11/2002 | Itoi | 386/52 |
| 6,542,445 B2 * | 4/2003 | Ijichi et al. | 369/30.08 |
| 6,636,474 B1 * | 10/2003 | Tanaka et al. | 369/275.3 |
| 6,721,489 B1 * | 4/2004 | Benyamin et al. | 386/46 |
| 6,748,160 B1 * | 6/2004 | Otomo et al. | 386/95 |
| 6,915,377 B2 * | 7/2005 | Hitotsui | 711/112 |
| 2001/0030827 A1 | 10/2001 | Morohashi | 360/69 |

FOREIGN PATENT DOCUMENTS

| | | |
|---|---|---|
| JP | 2000-215648 | 8/2000 |
| JP | 2000-287163 | 10/2000 |
| WO | WO 99/34601 | 7/1999 |

* cited by examiner

INFORMATION RECORDING APPARATUS INCLUDING INFORMATION ATTACHING AND GENERATING DEVICE WHICH GENERATES GROUP CONTROL INFORMATION

BACKGROUND OF THE INVENTION

1. Technical Field of the Invention

The present invention relates to an information recording apparatus having a device for attaching track number information to every track recorded in an information recording medium.

2. Description of the Prior Art

As an information recording medium in which music information and image information are recorded, a tape shaped information recording medium represented by a cassette tape, a DAT (digital audio tape), 8 mm tape and the like, and a disc information recording medium represented by an LD (laser disc), a CD (compact disc), an MD (mini disc), a DVD (digital versatile disc) and the like are known.

In recent years, writing and rewriting of information have been made possible in the disc information recording medium, and it has been remarkably spread combined with an advantage of quick access to the recorded information.

When music (hereinafter, simply described as "tune") is recorded in the disc information recording medium, one tune is made to be a unit called a "track", for example, and it can be controlled by attaching track number information. Such track number information is included in control information called a TOC (Table of content) recorded in the innermost peripheral part of the disc together with information to control recording data such as a disc name, a tune name, a tune number, a total playing time, a starting position and an ending position of the tune on the disc (a starting time and an ending time in the case of controlling the position by time information) and the like. When a user replays a recorded tune, he/she operates a recording, replaying and editing device for the disc to designate such track number information, and can select the recorded tune.

Incidentally, the number of tunes that can be recorded in one disc information recording medium has been remarkably increased due to improvement of information recording density in the disc information recording medium and a new information compression method. For example, the MD has conventionally adopted the information compression method called an ATRAC (Adaptive Transform Acoustic Coding). Recently, an MDLP standard has been established in which the information recording is performed by the information compression method called an ATRAC3 having compression efficiency double or four times that of the conventional ATRAC. According to the ATRAC3, the maximum 320 minute recording is possible with a four times extended recording mode by the MD having 80 minute standard recording time. With such a new information compression method, about 60 tunes can be recorded in one disc even if the playing time of one tune is about five minutes.

However, as the recording medium can record such a grate number of tunes, it takes much time to select a tune for replay to complicate the control of the tunes. Accordingly, a method has been proposed that the user gathers one or a plurality of tunes to make them a group and control the tunes by every group (hereinafter, referred to as "group control"). In such a group control, since information such as a same group name is attached to the tunes that belong to the same group (same genre, for example), the user can firstly designate the group name and then designate the track number information that belongs to the group, and thus the user can efficiently select the tune to be replayed.

However, to perform the group control, the user must decide a group for each tune, or a group for a range of tunes and input a group name or the like to each group. Particularly, when recording many tunes from various kinds of media, grouping the tunes cab become complicated, and the user may suffer an operation load.

Further, an input operation to attach the information such as a name to each group may also become troublesome, and it also may give the user the operation load.

SUMMARY OF THE INVENTION

The present invention has been created from the consideration of the foregoing points. The object of the present invention is to provide an information recording apparatus that can efficiently croup the track and can reduce the operation load of the user.

Moreover, another object of the present invention is to provide the information recording apparatus that can efficiently group the track to attach information proper for the group, and can reduce the operation load of the user.

The above object of the present invention can be achieved by an information recording apparatus of the present invention that is provided with information attaching and generating device, which attaches a track number information to each track recorded in an information recording medium and generates group control information to control one or a plurality of tracks as one group. The information recording apparatus is provided with: a detection device for giving a grouping instruction to said information attaching and generating device when any kind of change regarding track recording is detected, wherein said information attaching and generating device generates the group control information by making the tracks from the track where recording to said information recording medium is started to at least the track already recorded at the point when said grouping instruction is received be the same group.

According to the present invention, when the detection device detects a change regarding a track recording after the track recording has started, a grouping instruction is given to the information attaching and generation device. Then, the information attaching and generation device generates group control information by making the tracks from the one where the recording to the information recording medium is started to at least the one already recorded at the point when the grouping instruction is received be the same group, for example, the information of the same group name is attached. Therefore, since the grouping is automatically performed by any kind of change regarding the track recording, the user can omit the operation that he/she performs the grouping by himself/herself, and thus the operation load of the user can be reduced.

In one aspect of the present invention, said detection device gives the grouping instruction to said information attaching and generating device when an instruction to end the track recording in said information recording medium is detected, and said information attaching and generating device generates the group control information by making the tracks from the track where recording to said information recording medium is started to the track being recorded at the point when said grouping instruction is received be the same group.

According to the this aspect, when the detection device detects an instruction to end the track recording to the information recording medium after the track recording has started, the grouping instruction is given to the information attaching and generation device. Then, the information attaching and generation device generates the group control information by making the tracks from the one where the recording to the information recording medium is started to the one already recorded at the point when the grouping instruction is received be the same group, for example, the information of the same group name is attached. Therefore, since the grouping is automatically performed by the instruction to end the track recording, the user can omit the operation that he/she performs the grouping by himself/ herself, and thus the operation load of the user can be reduced.

In another aspect of the present invention, said information attaching and generating device attaches said track number information to the tracks sequentially recorded from the track where said recording is started in such a manner that the number continuously increases According to this aspect, the group control can be efficiently performed with the group control information because continuous track number information is attached to the track.

In further aspect of the present invention, said detection device gives the grouping instruction to said information attaching and generating device when an instruction to pause the track recording to said information recording medium is detected, and said information attaching and generating device generates the group control information by making the tracks from the track where recording to said information recording medium is started to the track being recorded at the point when said grouping instruction is received be the same group.

According to this aspect, when recording pause detection device detects an instruction to pause the track recording to the information recording medium after the track recording has started, the grouping instruction is given to the information attaching and generation device. Then, the information attaching and generation device generates the group control information by making the tracks from the one where the recording to the information recording medium is started to the one already recorded at the point when the grouping instruction is received be the same group, for example, the information of the same group name is attached. Therefore, since the grouping is automatically performed by the instruction to end the track recording, the user can omit the operation that he/she performs the grouping by himself/herself, and thus the operation load of the user can be reduced.

In further aspect of the present invention, said information attaching and generating device attaches said track number information to the tracks sequentially recorded from the track where said recording is started in such a manner that the number continuously increases.

According to this aspect, the group control can be efficiently performed with the group control information because continuous track number information is attached to the track.

In further aspect of the present invention, said detection device gives the grouping start instruction to said information attaching and generating device when an instruction to release said pause of the track recording to said information recording medium is detected, and said information attaching and generating device generates the group control information by making the track recorded at the point where said grouping start instruction is received and subsequent tracks be a new group.

According to this aspect, generation of a new group can be started from the track where the pause is released by the instruction to release the pause of the track recording.

In further aspect of the present invention, said detection device gives the grouping instruction to said information attaching and generating device when the instruction to change a track recording method to said information recording medium is detected.

According to the present invention, when recording method change detection device detects an instruction to change the method of the track recording to the information recording medium after the track recording has started, the grouping instruction is given to the information attaching and generation device. Then, the information attaching and generation device generates the group control information by making the tracks from the one where the recording to the information recording medium is started to the one already recorded at the point when the grouping instruction is received be the same group, for example, the information of the same group name is attached. Therefore, since the grouping is automatically performed by the recording method change, the user can omit the operation that he/she performs the grouping by himself/herself, and thus the operation load of the user can be reduced.

In further aspect of the present invention, said information attaching and generating device generates the group control information by making the track recorded after said grouping instruction is received be a group different from said track already recorded.

According to this aspect, the track recorded after receiving the grouping instruction can be made to be the group different from the track already recorded.

In further aspect of the present invention, said information attaching and generating device attaches said track number information to the tracks sequentially recorded from the track where said recording is started in such a manner that the number continuously increases.

According to this aspect, the group control can be efficiently performed with the group control information because continuous track number information is attached to the track.

In further aspect of the present invention, said detection device gives the grouping instruction to said information attaching and generating device when a change of an operation state of a device in a recording source is detected.

According to this aspect, when operation state change detection device detects an operation state change of a device in a recording source after the track recording has started, the grouping instruction is given to the information attaching and generation device. Then, the information attaching and generation device generates the group control information by making the tracks from the one where the recording to the information recording medium is started to the one already recorded at the point when the grouping instruction is received be the same group, for example, the information of the same group name is attached. Therefore, since the grouping is automatically performed by the operation state change of the device in the recording source, the user can omit the operation that he/she performs the grouping by himself/herself, and thus the operation load of the user can be reduced. Herein, the recording source device a source to supply the information to the information recording device, and an AM broadcasting, an FM broadcasting and the like, for example, are included other than the recording medium such as the CD, the MD and the DVD. In addition, the device in the recording source mainly device a device to supply the information of the recording source, for example, a CD player that supplies the information to the information recording device.

In further aspect of the present invention, said information attaching and generating device generates the group control information by making the track recorded after said grouping instruction is received be a group different from said track already recorded.

According to this aspect, the track recorded after receiving the grouping instruction can be made to be the group different from the track already recorded.

In further aspect of the present invention, said information attaching and generating device attaches said track number information to the tracks sequentially recorded from the track where said recording is started in such a manner that the number continuously increases.

According to this aspect, the group control can be efficiently performed with the group control information because continuous track number information is attached to the track.

In further aspect of the present invention, said detection device gives the grouping instruction to said information attaching and generating device when the a change of a recording mode in said information recording medium is detected.

According to this aspect, when recording mode change detection device detects a recording mode change in the information recording device after the track recording has started, the grouping instruction is given to the information attaching and generation device. Then, the information attaching and generation device generates the group control information by making the tracks from the one where the recording to the information recording medium is started to the one already recorded at the point when the grouping instruction is received be the same group, for example, the information of the same group name is attached. Therefore, since the grouping is automatically performed by the recording mode change of the device in the recording source, the user can omit the operation that he/she performs the grouping by himself/herself, and thus the operation load of the user can be reduced.

In further aspect of the present invention, said information attaching and generating device generates the group control information by making the track recorded after said grouping instruction is received be a group different from said track already recorded.

According to this aspect, the track recorded after receiving the grouping instruction can be made to be the group different from the track already recorded.

In further aspect of the present invention, said information attaching and generating device attaches said track number information to the tracks sequentially recorded from the track where said recording is started in such a manner that the number continuously increases.

According to the present invention, the group control can be efficiently performed with the group control information because continuous track number information is attached to the track.

In further aspect of the present invention, said detection device gives the grouping instruction to said information attaching and generating device when the change of a recording source is detected.

According to this aspect, when recording source change detection device detects a recording source change after the track recording has started, the grouping instruction is given to the information attaching and generation device. Then, the information attaching and generation device generates the group control information by making the tracks from the one where the recording to the information recording medium is started to the one already recorded at the point when the grouping instruction is received be the same group, for example, the information of the same group name is attached. Therefore, since the grouping is automatically performed by the recording source change, the user can omit the operation that he/she performs the grouping by himself/herself, and thus the operation load of the user can be reduced.

In further aspect of the present invention, said information attaching and generating device generates the group control information by making the track recorded after said grouping instruction is received be a group different from said track already recorded.

According to this aspect, the track recorded after receiving the grouping instruction can be made to be the group different from the track already recorded.

In further aspect of the present invention, said information attaching and generating device attaches said track number information to the tracks sequentially recorded from the track where said recording is started in such a manner that the number continuously increases.

According to this aspect, the group control can be efficiently performed with the group control information because continuous track number information is attached to the track.

In further aspect of the present invention, said information attaching and generating device attaches the track number information in such a manner that said track number information attached to the tracks from the track where said recording is started to the track already recorded at the point when said grouping instruction is received and said track number information attached to the track recorded after said grouping instruction is received are discriminated.

According to this aspect, since the track number information attached to the track is discriminated before and after receiving the grouping instruction, the user can easily grasp individual group from the track number information as well.

In further aspect of the present invention, said information recording apparatus is further provided with a registration device for registering a group information in accordance with content of a change detected by said detection device, wherein said information attaching and generating device further attaches the group information in accordance with the content of said detected change to the track that belongs to said same group.

According to this aspect, the group information (group name information, for example) in accordance with the content of the change detected by the detection device is registered. When the detection device detects any kind of change regarding the track recording after the track recording has started, the grouping instruction is given to information attaching and generating device. Then, the tracks from the one where the recording to the information recording medium has started to the one already recorded at the point when the grouping instruction was received are made to be the same group, and the group information in accordance with the content of the detected change is attached to the track that belongs to the group. Therefore, since the information such as the group name corresponding to the content of the detected change is automatically attached to the track, the user does not need to input the information such as the group name, and thus the operation load of the user can be reduced.

In further aspect of the present invention, said information recording apparatus is further provided with a registration device for reading out information from a recorded track regarding the track and registering the information as a group information, wherein said information attaching and generating device further attaches said group information regarding the track that belongs to said same group to the track that belongs to said same group.

According to this aspect, the information regarding the recorded track is read out from the track, and it is registered as the group information. When the detection means detects any kind of change regarding the track recording, the grouping instruction is given to the information attaching means. Then, the tracks from the one where the recording to the information recording medium has started to the one already recorded at the point when the grouping instruction was received are made to be the same group, and the group information regarding the track that belongs to the group is attached to the track that belongs to the group. Therefore, since the information regarding the track is automatically read out from the track being recorded and is attached to the track that belongs to the generated group as the group information, the user does not have to input the group information, and thus the operation load of the user can be reduced.

In further aspect of the present invention, said registration device performs registration after changing a part of the group information when it is concluded that information same as the information regarding said read out track is already registered.

According to this aspect, since a change is automatically added to a part of the group information even in the case where the information regarding the read out track is the same, every group can be clearly discriminated.

In further aspect of the present invention, said registration device performs registration by adding a change that a sub-number is given to the group information.

According to the present invention, every group can be clearly discriminated because a sub-number is attached to the group information even when the information regarding the readout track is the same.

DESCRIPTION OF THE PREFERRED EMBODIMENTS

The preferred embodiments of the present invention will be described with reference to the accompanying drawings. The following description is the embodiments when the information recording apparatus of the present invention is applied to the magnetic optical disc recording and replaying apparatus.

(First Embodiment)

Figure 1:
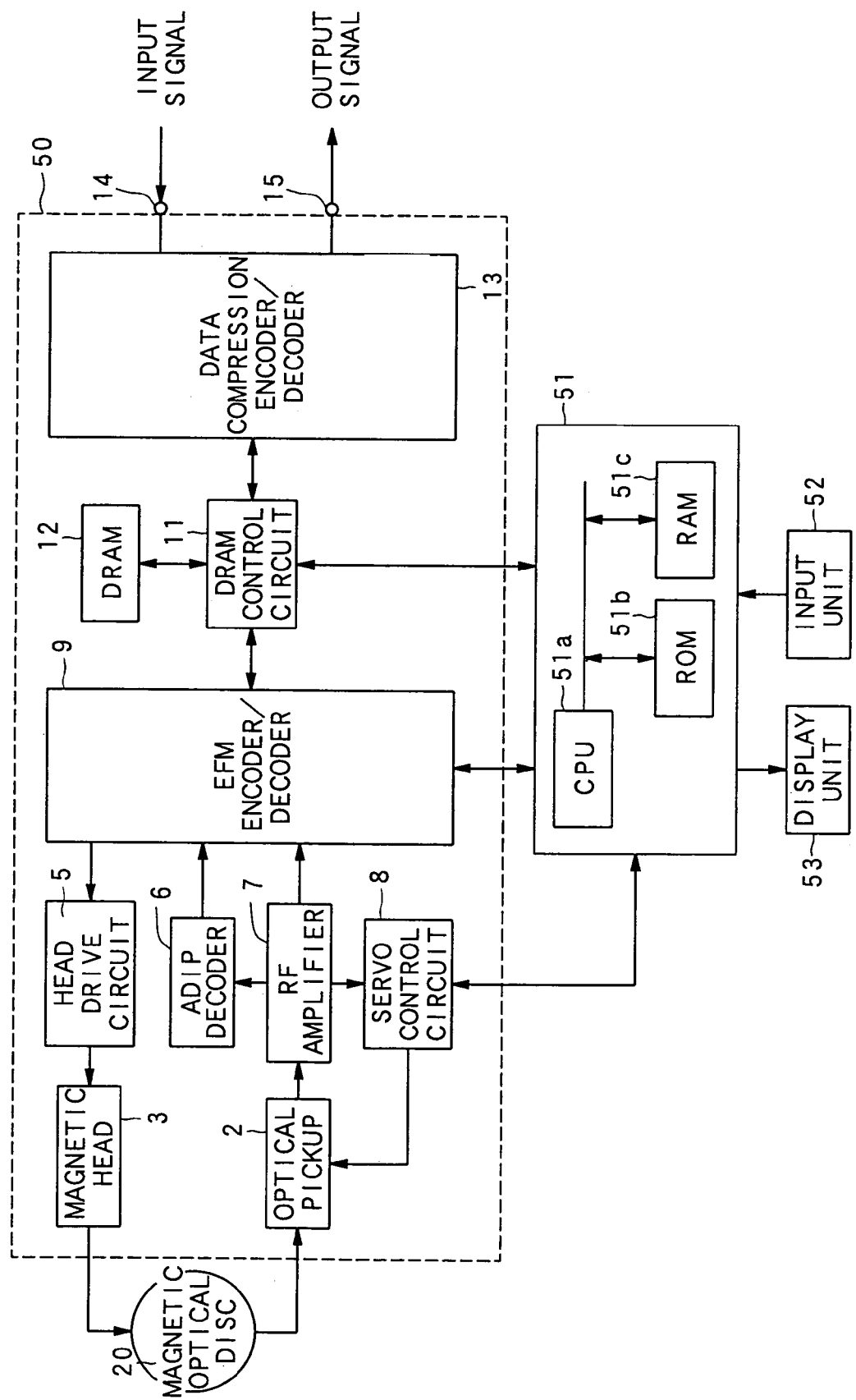
FIG. 1 is a view showing a schematic constitutional example of a magnetic optical disc recording and replaying device according to the present invention.

FIG. 1 shows a schematic constitutional example of a magnetic optical disc recording and replaying apparatus 100 according to the embodiment of the present invention. As shown in FIG. 1, the magnetic optical disc recording and replaying apparatus 100 is comprised of: an information recording and replaying unit 50; a system controller 51; an input unit 52; and a display unit 53. These units are connected with each other as shown in the drawing.

The information recording and replaying unit 50 is comprised of: a spindle motor (not shown) to rotate a magnetic optical disc 20; an optical pickup 2; an RF amplifier 7; an ADIP decoder 6; An EFM encoder/recorder 9; a magnetic head 3; a head drive circuit 5; a DRAM (Dynamic Random Access Memory) 12; a DRAM control circuit 11; a data compression encoder/decorder 13; and a servo control circuit 8.

The optical pickup 2 is comprised of: a laser diode that emits a laser beam (not shown); various kinds of splitters that splits an emitted beam from the laser diode and a reflected beam form the magnetic optical disc in accordance with an object; a detector that converts the reflected beam from the magnetic optical disc 20 and the beam split by the various kinds of splitters to an electric signal; and an actuator that focuses the laser beam to the magnetic optical disc 20 and positions the laser beam on the information track.

The RF amplifier 7 generates various kinds of signals in accordance with the object from various kinds of electric signals from the optical pickup 2.

The ADIP decoder 6 detects address signal of the magnetic optical disc 20 from a wobble signal. It is to be noted that the wobble signal is the signal obtained by extracting a wobble of a groove previously recorded in the magnetic optical disc 20, which is generated by the RF amplifier 7.

The EFM encoder/decoder 9, when replaying the information recorded in the magnetic optical disc 20, performs EFM (eight to Fourteen Modulation) modulation to the signal, which is obtained by extracting the signal recorded in the magnetic optical disc 20, which is the data of the RF (Radio Frequency) generated in the RF amplifier 7. Further, when recording the information in the magnetic optical disc 20, the EFM encoder/decoder 9 has a function to perform the EFM modulation to the data from the DRAM 12 (described later).

The magnetic head 3, when recording the information to the magnetic optical disc 20, applies magnetic field to the magnetic film of the magnetic optical disc 20 heated to the Curie temperature or more by the laser beam.

The head drive circuit 5 determines the orientation of the magnetic field to the magnetic head 3 in accordance with the data to which the EFM modulation has been performed by the EFM encoder/decoder 9, and drives the magnetic head 3.

The DRAM 12, when replaying the information from the magnetic optical disc 20, stores the data to which the EFM modulation has been performed by the EFM encoder/decoder 9. Further, when recording the information to the magnetic optical disc 20, the DRAM 12 stores the data compressed by the data compression encoder/decoder 13(described later).

The DRAM control circuit 11 controls the data input/output to the DRAM 12.

The data compression encoder/decoder 13, when replaying the information from the magnetic optical disc 20, expands the data from the DRAM 12 to output the expanded signal from an output unit 15. Further, when recording the information to the magnetic optical disc 20, the data compression encoder/decoder 13 compresses the signal from an input unit 14 to output to the DRAM 12.

The servo control circuit 8 controls the spindle motor, a carriage motor that drives optical pickup 2 to a radius direction and the actuator of the optical pickup 2.

It is to be noted that an A/D converter to convert an analog signal to a digital signal and a D/A converter that converts the digital signal to the analog signal are omitted from the drawing.

The system controller 51 includes a CPU 51a, a ROM 51b and a RAM 51c to control each component in the information recording and replaying unit 50, and performs recording, reading and replaying of the information to the magnetic optical disc 20. Further, the CPU 51a of the system controller 51 generates the control information called a TOC to which the processing of grouping (hereinafter, referred to as "grouping processing") when recording the information to the magnetic optical disc 20. Furthermore, the TOC is recorded in the innermost peripheral part of the magnetic optical disc immediate before the magnetic optical disc 20 is taken out from the magnetic optical disc recording and replaying device 100. A grouping processing program and the like are stored in the ROM 51b, and the RAM 51c is mainly used as a work area. The input unit 52 is the one to give the system controller 10 various kinds of operation instructions from the outside, and it gives the system controller 10 the instruction from the user. The display unit 53 is the one to display a playing state of the magnetic optical disc recording and replaying device 100 and the information necessary for the user.

In such a constitution, during the operation of the information recording of the magnetic optical disc recording and replaying device 100, the input signal (a tune replayed from the CD player, the AM or FM broadcasting, for example) is input to the input unit 14 is supplied to the data compression encoder/decoder 13, the data compression encoding processing is performed, and the data of the tune is temporarily written in the DRAM by the DRAM control circuit 11 based on the instruction of the system controller 10. Then the data is read out in a predetermined timing and sent to the EFM encoder/decoder 9, and is supplied to the head drive circuit 5 after the encoding processing is performed in the EFM encoder/decoder 9. And then, the head drive circuit 5 supplies a magnetic head drive signal to the magnetic head 3 in accordance with the compressed data to which the encoding processing has been performed and simultaneously increases the output of the laser diode of the optical pickup 2 to heat the magnetic film of the magnetic optical disc 20 to the Curie temperature or more, and thus the data of the tune is recorded to the magnetic optical disc 20. Further, at this point, the servo control circuit 8 performs servo control based on the instruction of the system controller 51.

As described above, when the information is recorded to the magnetic optical disc 20, system controller 51 performs the grouping processing. The grouping processing will be described in more detail. Firstly, the logical structure of the TOC according to the grouping processing will be described with reference to FIG. 2. The TOC according to this embodiment is comprised of the group control information including the group name information and the like other than the control information such as the disc name, the track number information attached to one track, the tune name, the number of tunes, the total playing time and the like. The group control information is the information generated to control one or a plurality of the tracks as one group. The group (group name information) and the track number information are related by the group control information, It is to be noted that in the case where the group name information is attached to the track that belongs to a group, there are two methods: one is the method where information as to each track belongs to which group is attached to each track; and the other is the method that the information as to which track belongs to the group is attached to each group. In the case of the former method, the group control information is made to be a mode called <<TNO1/Group A, TNO2/Group B, TNO3/Group A, TNO4/Group C, TNO5/Group C>>, and in the case of the latter method, the it is made to be a mode called <<Group A/TNO1&TNO2&TNO3, Group B/TNO4&TNO5)) . It is to be noted that the meanings of "TNO1", "Group A" and the like will be described later. In this embodiment, the track and the tune correspond in one by one.

Figure 2:
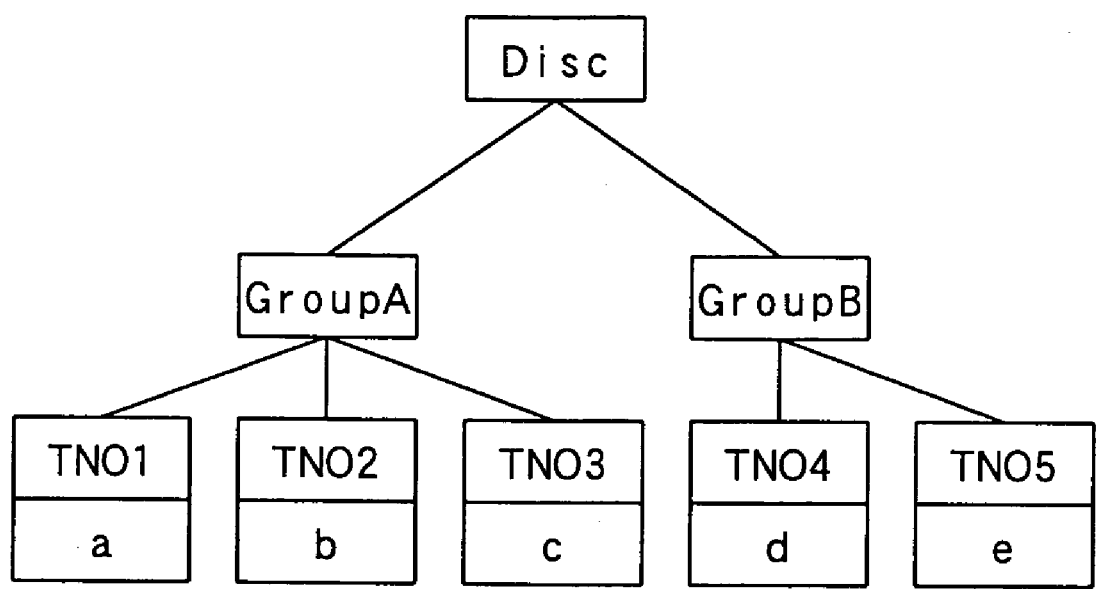
FIG. 2 is a view showing a relation (logical structure) among the group name information, the track number information and the track (tune)

FIG. 2 is a view showing the relation (logical structure) among the disc name, the group name information, the track number information and the track (tune) name, in such TOC. In FIG. 2, "Disc" shows the disc name. "Group A" shows the group controlled by the name of "A" (Groups B, C, D, . . . also show the groups controlled by their names). "TNO1" shows the track number information called "1" (TNO2, 3, . . . also show the track number information of their numbers). "a" shows the track called "a" (herein, a tune called "a") (b, c, d, . . . also show tunes of their names).

In the example of FIG. 2, Group A and Group B are registered with one disc. Further, the tune "a" attached with TON1, the tune "b" attached with TNO2 and the tune "c" attached with TNO3 belong to Group A. The tune "d" attached with TNO4 and the tune "e" attached with TNO5 belong to Group B.

Then, in the grouping processing, the grouping is performed in accordance with any kind of change regarding the track recording detected by the detection device during recording of the tune (track). There are various kinds of change contents detected by the detection device such as the instruction to end the track recording, the instruction to pause the track recording, the instruction to change the track recording method, the change of the operation state of the device in the recording source, the change of the recording mode, the change of the source and the like, for example.

Herein, in the case of attaching the track number information in the grouping processing, a rule of attaching the track number information (hereinafter, referred to as "TNO attaching rule") is regulated in which: (1) the same track number information should not be used in different groups; and (2) the track numbers in each group have seriality that increases from the first number to the last number, and omitted number should be accepted.

In the following, the grouping processing will be described referring to the flowcharts of FIG. 3 to FIG. 8.

Figure 3:
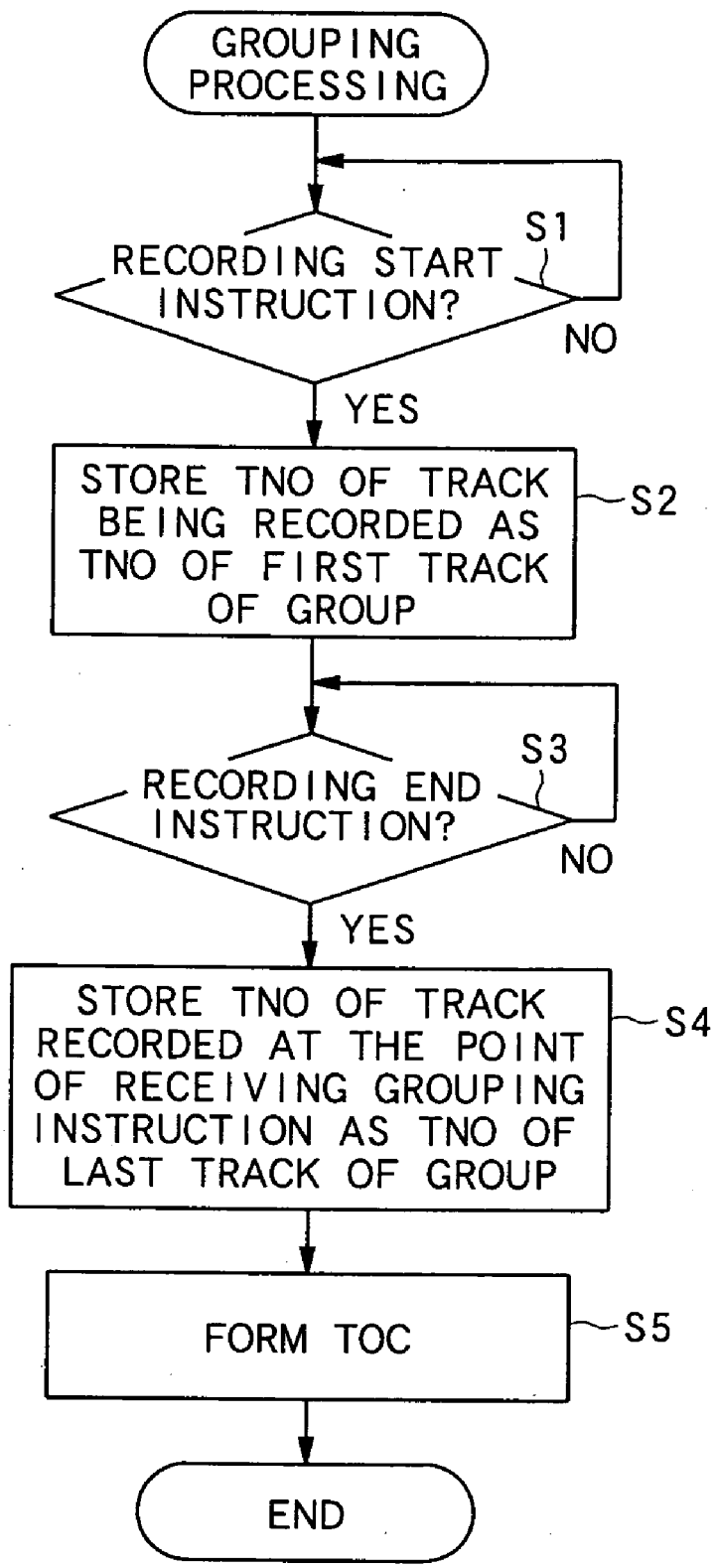
FIG. 3 is a flowchart showing a grouping processing in the case where the grouping is performed when the end of recording is detected.

FIG. 3 is a flowchart showing the grouping processing in the case where the grouping is performed when the instruction of the end of recording is detected. Herein, a case is shown in which the tunes from the one where the recording has started to the tune where the recording has ended are made to be one group.

Firstly, the user operates the input unit 52 to set the group name information (Group A, Group B, ..., for example) that he/she wants to attach to the tune (track). Then, in the case of performing dubbing the tune output form the CD player to the magnetic optical disc 20, for example, when the user operates the input unit 52 to enter the recording instruction, the CPU 51a recognizes it (step S1), and starts the information recording control of each component of the magnetic optical disc recording and replaying device 100. And then, when the tune output from the CD player is input to the DRAM control circuit via the input unit 52 and the data compression encoder/decoder, the CPU 51a recognizes it to store it in the RAM 51c by setting the TNO of the tune where the recording has started (being recorded) as the TNO of the first tune (track) of the group (step S2).

Next, when the user operates the input unit 52 to enter the instruction to end the tune (track) recording (pressing a "stop recording" button, for example), the CPU 51a detects it (step S3) and outputs the grouping instruction internally When the CPU 51a executes an information attaching and generating routine, the TNO of the tune (track) being recorded is stored in the RAM 51c as the TNO of the last tune (track) of the group (step S4).

Moreover, by executing the information attaching and generating routine, the same group name information (Group A, for example) is attached to the TNO of the first tune stored in the RAM 51c in step S2 to the TNO of the last tune stored in the RAM 51c in step S4, and thus the group control information is generated. Further, by executing the information attaching and generating routine, the TNO is attached to the recorded tune (track) based on the TNO attaching rule, and the TOC is formed (step S5). The TOC is finally recorded in the innermost peripheral part of the magnetic optical disc 20. Thus, when performing dubbing from the CE to the magnetic optical disc 20, for example, from the recording start to the recording end are made to be one group, and thus the grouping can be performed. In addition, when dubbing of three tunes has been performed from the CD to the magnetic optical disc 20 to which no tune was recorded, TNO1, TNO2 and TNO3 are attached to each tune (track), and when dubbing of the three tunes has been performed to the magnetic optical disc 20 to which a few tunes were already recorded, the TNOs next to the largest TNO recorded in the magnetic optical disc 20 are attached to the tunes.

Figure 4:
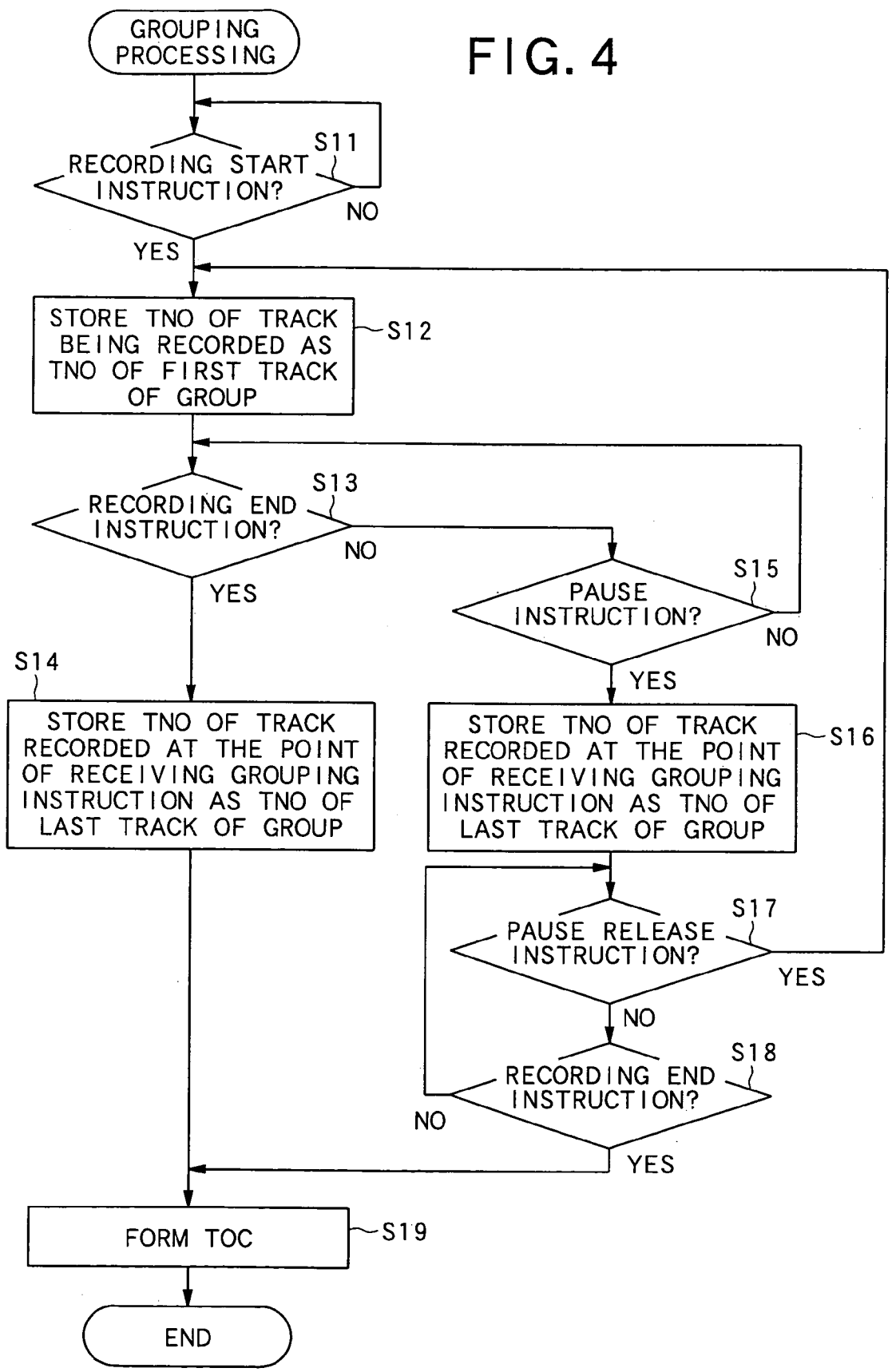
FIG. 4 is a flowchart showing a grouping processing in the case where the grouping is performed when the pause of recording is detected.

FIG. 4 is a flowchart showing the grouping processing in the case where the grouping is performed when the instruction of the pause of recording is detected. Herein, a case is shown in which the tunes from the one where the recording has started to the tune where the recording has paused are made to be one group.

Firstly, the user operates the input unit 52 to set a few of the group name information that he/she wants to attach to the tune (track) It is to be noted that redundant description will be omitted because step S11 to step S14 are the same as step S1 to step S4 in the attaching processing of FIG. 3.

In step S15, when the user operates the input unit 52 to enter the instruction to pause the recording of the tune (track) (pressing a "pause" button, for example), the CPU 51a detects it to output the grouping instruction internally. When the CPU 51a executes the information attaching and generating routine, the TNO of the tune (track) being recorded at the point when the grouping instruction has been received is stored in the RAM 51c as the TNO of the last tune (track) of the group in accordance with the grouping instruction (step S16). Specifically, the tunes from the one where the recording has been started to the tune where the recording has been paused are made to be one group (the first group), and thus the grouping is performed.

Next, when the user operates the input unit 52 to input the instruction to release the pause of the tune (track) recording (pressing the "pause" button, for example), the CPU 51a detects it to return to step S12. With this operation, the TNO of the first tune (track) to be recorded after releasing the pause is stored in the RAM 51c as the TNO of the first tune (track) of the next group (the second group) (step S12). Hereinafter, the processing is repeated similarly to FIG. 3, the same group name information is attached to the TNO of the tune (track) that belongs to the group regarding each group, and thus the group control information is generated. Further, by executing the information attaching and generating routine, the TNO is attached to the recorded tune (track) based on the TNO attaching rule, and thus the TOC is formed (step S19). As described, when performing dubbing from the CD to the magnetic optical disc 20, for example, the recording start to the pause are made to be one group, and the grouping can be performed.

Figure 5:
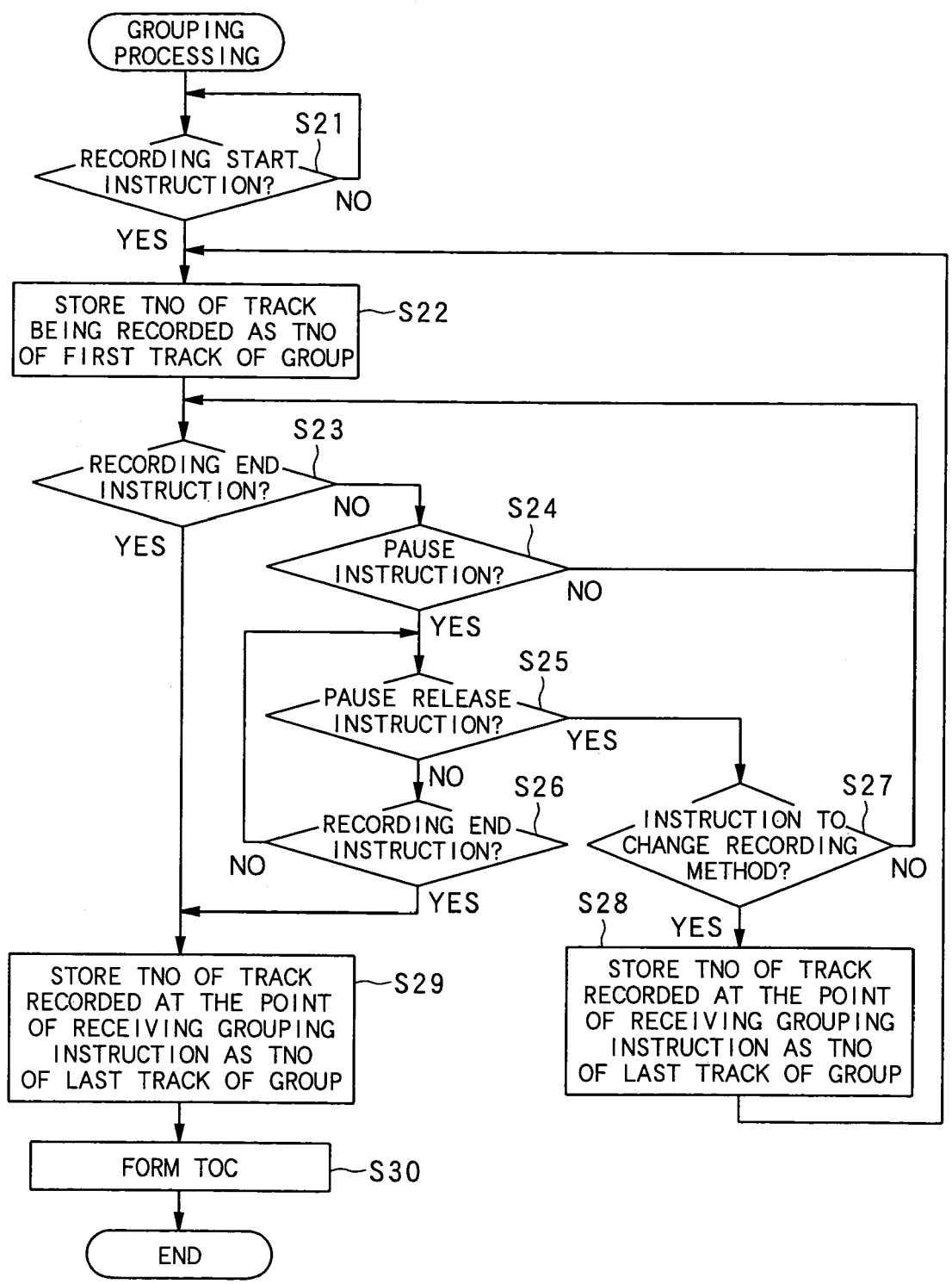
FIG. 5 is a flowchart showing a grouping processing in the case where the grouping is performed when the change of recording method is detected.

FIG. 5 is a flowchart showing the grouping processing in the case where the grouping is performed when the instruction of changing the track recording method is detected. Herein, a case is shown in which the tunes from the one where the recording has started to the tune already recorded at the point where the recording method has been changed are made to be one group, This is the one that performs the grouping depending on the difference of the recording mode, for example, which is applied to the case where the recording method is changed such as an ATRAC and an ATRAC3 (double extended recording mode and four times extended recording mode).

Firstly, the user operates the input unit 52 to set a few of the group name information that he/she wants to attach to the tune (track). It is to be noted that the redundant description will be omitted because step S21 to step S23 and step S29 are the same as step S1 to step S4 in the attaching processing of FIG. 3.

In step S24, when the user operates the input unit 52 to enter the instruction to pause the recording of the tune (track) (pressing the "pause" button, for example), the CPU 51a detects it. Herein, the CPU 51a does not store the TNO of the tune (track) being recorded in the RAM 51c as the TNO of the last tune (track) of the group, but determines whether the instruction to release the pause of the tune (track) recording is entered or not (step S25). When the user operates the input unit 52 to enter the instruction to release the pause of the tune (track) recording, the CPU 51a detects it to determine whether the instruction to change the recording method of the tune (track) is made (step S27). For example, when the user operates the input unit 52 to enter the instruction to change the recording method of the tune (track), the CPU 51a detects it to output the grouping instruction internally. When the CPU 51a executes the information attaching and generating routine, the TNO of the tune (track) already recorded at the point when the grouping instruction has been received is stored in the RAM 51c as the TNO of the last tune (track) of the group in accordance with the grouping instruction (step S28). Specifically, the TNO of the tune (track) before the one (track) to which the recording method has been changed is stored in the RAM 51c as the TNO of the last tune (track) of the group. Accordingly, the tunes from the one where the recording has been started to the tune before the one to which the recording method has been changed are made to be one group (the first group), and the grouping is thus performed.

Then, returning to step S22, the TNO of the first tune (track) to which the recording method has been changed is stored in the RAM 51*c* as the first tune (track) of the next group (the second group). Then, when there is no change in the recording method of the track, the group is formed in accordance with the instruction to end the track recording similarly to the foregoing processing of FIG. 3. Hereinafter, the processing similar to FIG. 3 or FIG. 4 is repeated, the same group name information is attached to the TNO of the tune (track) that belongs to the group regarding each group, and the group control information is generated. Further, by executing the information attaching and generating routine, the TNO is attached to the recorded tune (track) based on the TNO attaching rule, and the TOC is formed (step S30). As described, when performing dubbing from the CD to the magnetic optical disc 20, the tunes from the one where the recording has been started to the tune already recorded at the point when the recording method has been changed are made to be one group, and the grouping can be performed.

Figure 6:
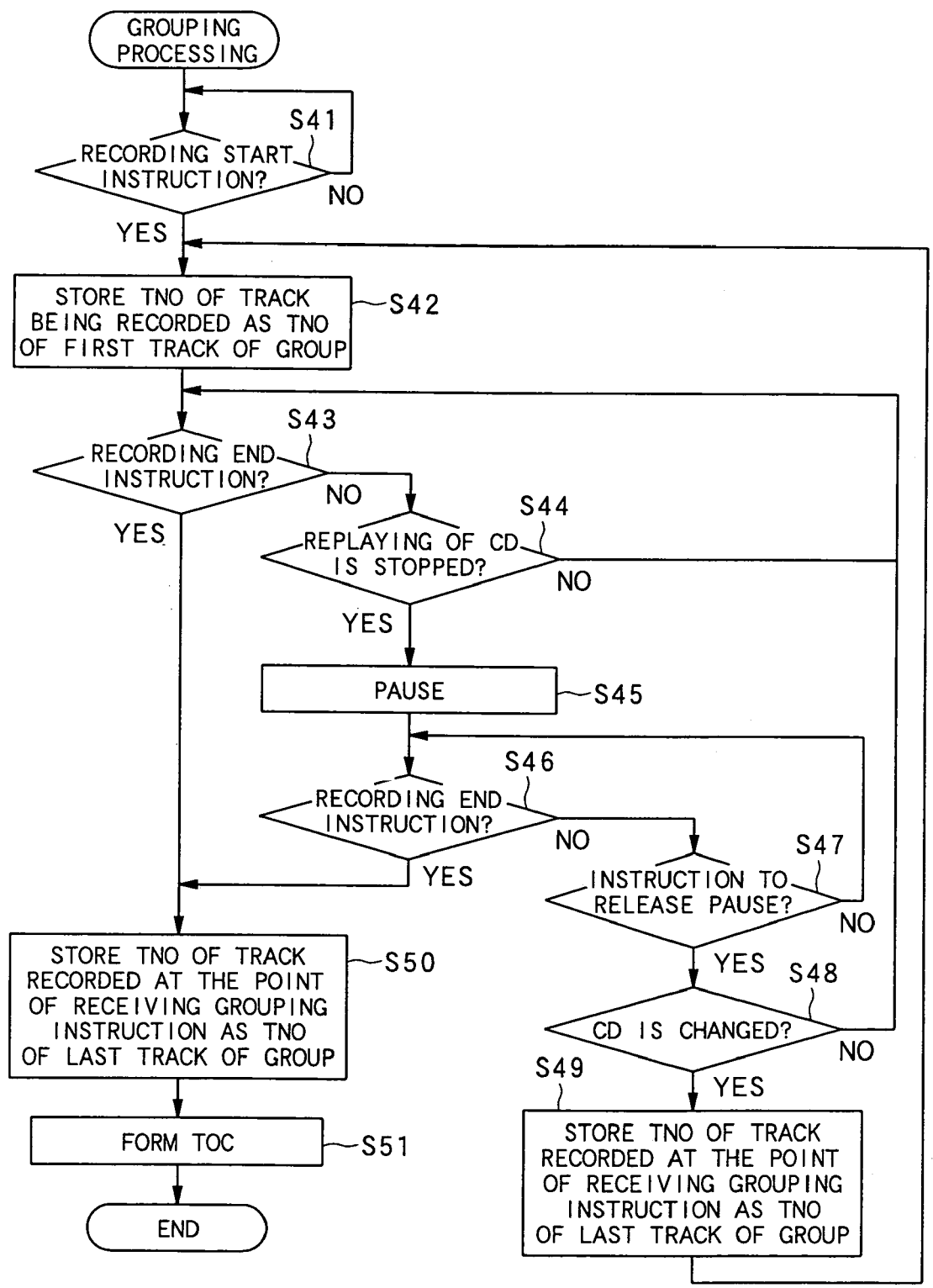
FIG. 6 is a flowchart showing a grouping processing in the case where the grouping is performed when the change of operation state is detected.

FIG. 6 is a flowchart showing the grouping processing in the case where the grouping is performed when the change of the operation state of the device in the recording source is detected. Herein, a case is shown in which the tunes from the one where the recording has been started to the tune already recorded at the point when the instruction of changing the CD has been made in the device, the CD player for example, in the recording source are made to be one group.

Firstly, the user operates the input unit 52 to set a few of the group name information that he/she wants to attach to the tune (track). It is to be noted that redundant description will be omitted because step S41 to step S43 and step S50 are the same as step S1 to step S4 in the attaching processing of FIG. 3.

In step S44, the CPU 51*a* determines whether there is a change in the operation state of the CD player as a sound source based on the signal input by the CD player, for example, whether replaying of the CD has been stopped. If the CPU 51*a* detects that the replaying of the CD has been stopped, the CPU 51*a* pauses the recording function (step S45). Then, when a recording end instruction is not made by the user (step S46), the CPU 51*a* determines whether there is a pause release instruction (step S47). When the pause is released to resume the recording, the CPU 51*a* determines whether the CD has been changed (step S48). When the CPU 51*a* detects that the CD has been changed, it outputs the grouping instruction internally.

When the CPU 51*a* executes the information attaching and generating routine, the TNO of the tune (track) already recorded at the point when the grouping instruction has been received is stored in the RAM 51*c* as the TNO of the last tune (track) of the group (step S49). Specifically, the tunes from the one where the recording has been started to the tune already recorded at the point when the instruction of changing the CD has been made are made to be one group (the first group), and thus the grouping is performed.

Then, returning to step S42, the TNO of the first tune (track) after the one to which the change of the operation state has been performed in the device of the recording source is stored in the RAM 51*c* as the TNO of the first tune (track) of the next group (the second group). Then, when there is no further change to the operation state of the CD player, the group is formed in accordance with the instruction to end the track recording similarly to the foregoing processing of FIG. 3. Hereinafter, the processing is repeated similar to FIG. 3 and FIG. 4, and the same group name information is attached to the TNO of the tune (track) that belongs to the group for each group, and thus the group control information is generated Further, by executing the information attaching and generating routine, the TNO is attached to the recorded tune (track) based on the TNO attaching rule, and the TOC is formed (step S51). As described, when performing dubbing from the CD to the magnetic optical disc 20, for example, the tunes from the one where the recording has been started to the tune already recorded at the point when the operation state of the CD player has been changed are made to be one group, and the grouping can be performed. It is to be noted that the example of FIG. 6 was described by exemplifying the case of detecting the changing of the CD, but the processing of step S49 may be performed by detecting the changing of the CD by a disc changer of the device in the recording source. Although the example of FIG. 6 showed the device in the recording source as the CD player, it may be another device such as a cassette tape player, an MD player and a tuner. In the case of the tuner, the processing of step S49 may be performed by detecting the change of a receiving station.

Figure 7:
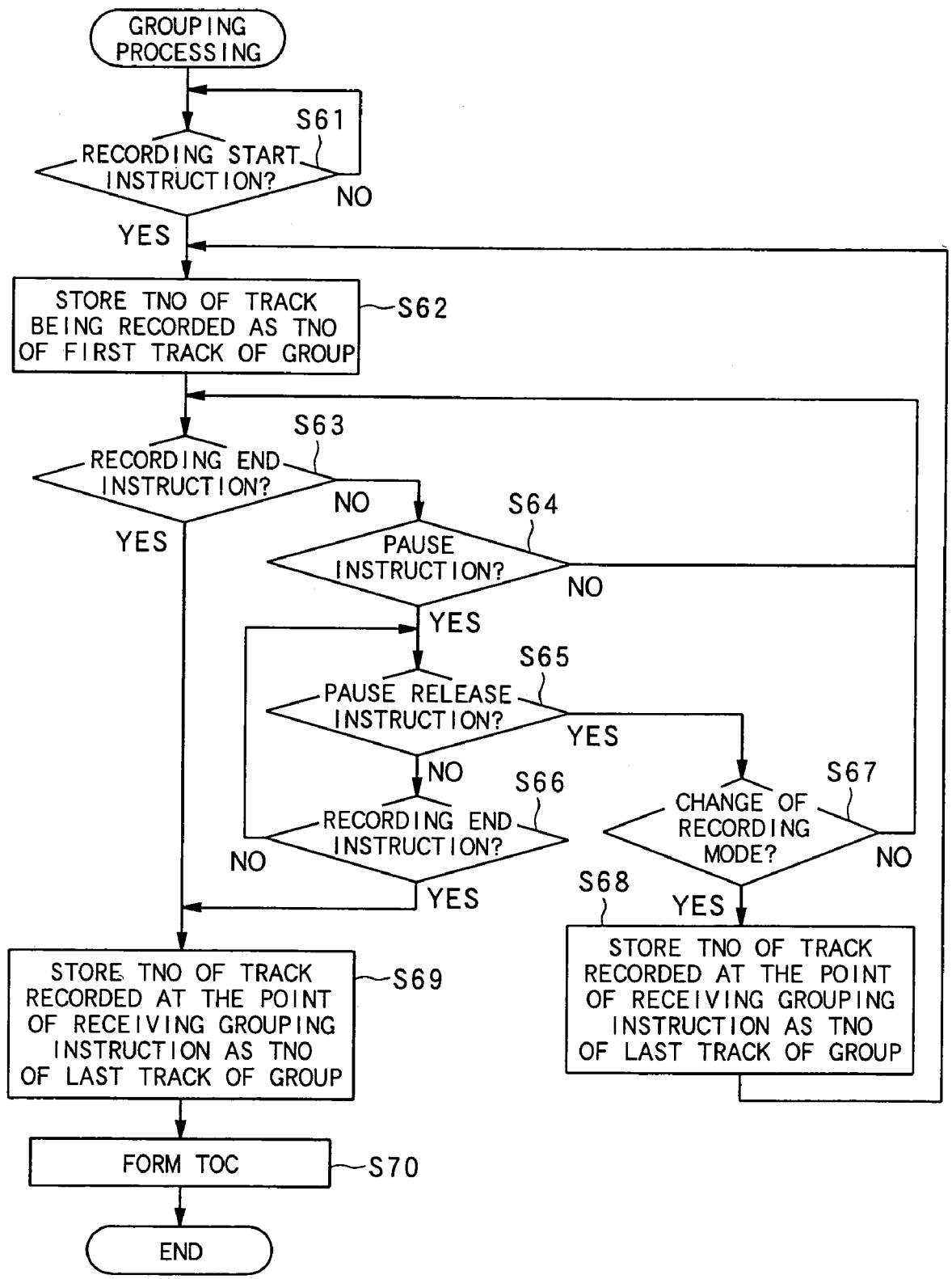
FIG. 7 is a flowchart showing a grouping processing in the case where the grouping is performed when the change of recording mode is detected.

FIG. 7 is a flowchart showing the grouping processing in the case where the grouping is performed when the change of recording mode is detected. Herein, a case is shown in which the tunes from the one where the recording has been started to the tune already recorded at the point when the recording mode has been changed are made to be one group. In this case, the recording mode shows a special recording mode such as a mode to record only the first tune of the CD, or a mode to record only track that has been set.

Firstly, the user operates the input unit 52 to set a few of the group name information that he/she wants to attach to the tune (track). It is to be noted that redundant description will be omitted because step S61 to step S63 and step S69 are the same as step S1 to step S4 in the attaching processing of FIG. 3.

In step S64, when the user operates the input unit 52 to enter the instruction to pause the tune (track) recording, the CPU 51*a* detects it. Next, the CPU 51*a* determines whether the instruction to release the pause of the tune (track) recording has been entered (step S65). When the user operates the input unit 52 to enter the instruction to release the pause of the tune (track) recording, the CPU 51*a* detects it to determine whether the recording mode of the tune (track) has been changed (step S67). When it is determined that the recording mode has been changed, the CPU 51*a* detects it to output the grouping instruction internally. When the CPU 51*a* executes the information attaching and generating routine, the TNO of the tune (track) already recorded at the point of receiving the grouping instruction is stored in the RAM 51*c* as the TNO of the last tune (track) of the group (step S28). Specifically, the TNO of the tune (track) before the tune (track) to which the recording mode has been changed is stored in the RAM 51*c* as the TNO of the last tune (track) of the group. Accordingly, the tunes from the one where the recording has been started to the tune before the one to which the recording mode has been changed are made to be one group (the first group), and thus the grouping is performed.

And then, returning to step S62, the TNO of the first tune (track) to which the recording mode has been changed is stored in the RAM 51*c* as the first tune (track) of the next group (the second group). Then, when there is no further change to the track recording mode, the group is formed in accordance with the instruction to end the track recording similarly to the foregoing processing of FIG. 3. Hereinafter, the processing is repeated similar to FIG. 3 or FIG. 4, and the same group name information is attached to the TNO of the tune (track) that belongs to the group for each group, and thus the group control information is generated. Further, by executing the information attaching and generating routine, the TNO is attached to the recorded tune (track) based on the TNO attaching rule, and the TOC is formed (step S70). As described, when performing dubbing from the CD to the magnetic optical disc 20, for example, the tunes from the one where the recording has been started to the tune already recorded at the point when the recording mode has been changed are made to be one group.

Figure 8:
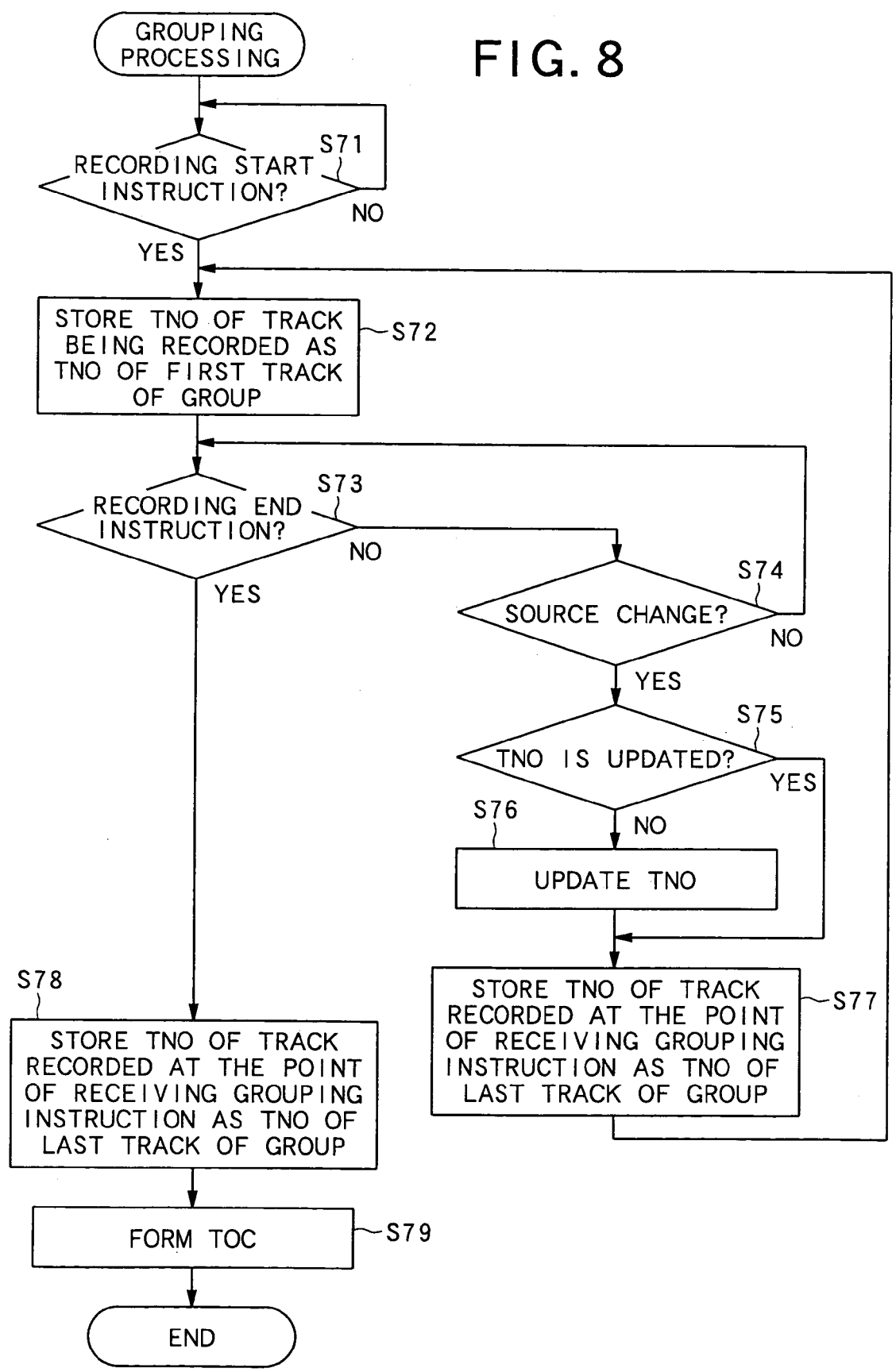
FIG. 8 is a flowchart showing a grouping processing in the case where the grouping is performed when the change of recording source is detected.

FIG. 8 is a flowchart showing the grouping processing in the case where the grouping is performed when the change of recording source is detected. Herein, a case is shown in which the tunes from the one where the recording has been started to the tune already recorded at the point when the recording source has been change, for example, from the CD to the tuner, are made to be one group.

Firstly, the user operates the input unit 52 to set a few of the group name information that he/she wants to attach to the tune (track). It is to be noted that redundant description will be omitted because step S71 to step S73 and step S78 are the same as step S1 to step S4 in the attaching processing of FIG. 3.

In step S74, when the recording source is changed, for example, from the CD player to another CD player, from the CD to the AM or FM broadcasting, the CPU 51a detects it to output the grouping instruction internally. When the CPU 51a executes the information attaching and generating routine, the TNO is updated in accordance with the grouping instruction (step S75 and S76). This is because the TNOs attached to the tunes (tracks) before and after the recording source is changed should be discriminated. Then, by executing the information attaching and generating routine, the TNO of the tune (track) already recorded at the point of receiving the instruction to change the recording source is stored in the RAM 51c as the TNO of the last tune (track) of the group (step S77). Specifically, the TNO of the tune before the one to which the recording source has been changed is stored in the RAM 51c as the TNO of the last tune (track) of the group. Accordingly, the tunes from the one where the recording has been started to the tune before the one to which the recording source has been changed are made to be one group (the first group), thus the grouping is performed.

Then, returning to step S72, the TNO of the first tune (track) to which the recording source has been changed is stored in the RAM 51c as the first tune (track) of the next group (the second group). When there is no further change to the recording source of the track, the group is formed in accordance with the instruction to end the track recording similarly to the foregoing processing of FIG. 3. Hereinafter, the processing is repeated similarly to FIG. 3 and FIG. 4, and the same group name information is attached to the TNO of the tune (track) that belongs to the group for each group, and the group control information is generated. Further, by executing the information attaching and generating routine, the TNO is attached to the recorded tune (track) based on the TNO attaching rule, and the TOC is thus formed (step S79). As described, the tunes from the one where the recording has been started to the tune already recorded at the point when the recording source has been changed can be made as one group. It is to be noted that this can be applicable not only to the change (switching) of individual source such as the CD and the tuner, but also to the switching of recording input (Digital, Opt/Digital, Coaxial/Analog). The processing of step S77 may be performed by detecting the change of a category code in the digital input. Furthermore, in the case of input from the tuner, the processing of step S77 may be performed by detecting the change of data content of multiplex FM broadcasting or the like.

In the processing of FIG. 3 to FIG. 8, if the recording is not performed by dubbing from the CD but by air check, one TNO is attached to a period from the recording start to the recording end, and the group name information is attached to the tunes (tracks) in the period.

Also in the processing of FIG. 3 to FIG. 8, description was made for the case of the grouping when detection was made for the instruction to end the track recording, the instruction to pause the track recording, the instruction to change the track recording method, the change of the operation state of the device in the recording source, the change of the recording mode, or the change of the source. However, the grouping is not limited to these and other detection means may be constituted in which the change of genre of the tune (track) or the name of a singer is detected to perform the grouping.

In addition, in the processing of FIG. 3 to FIG. 8, the group name information set by the user may be set not only before the recording start of the tune (track) but also during the recording. Further, in the case of setting no group name information, a name (A, B, C or the like) previously set in the ROM 51b or the like is attached, and the user can change it to a name that he/she desires after the recording.

Furthermore, in the foregoing FIG. 3 to FIG. 8, description was made for the grouping by each detection means in each processing, but the grouping processing of FIG. 3 to FIG. 8 are integrated in an actual processing operation.

As described, according to this embodiment, since the grouping is automatically performed in accordance with any kind of change (recording stop or recording pause, for example) regarding the track recording when recording the tune (track), the user may only enter the group name information (group name), the user can omit the operation that he/she performs the grouping by himself/herself, and thus the operation load of the user can be reduced.

(Second Embodiment)

Figure 9:
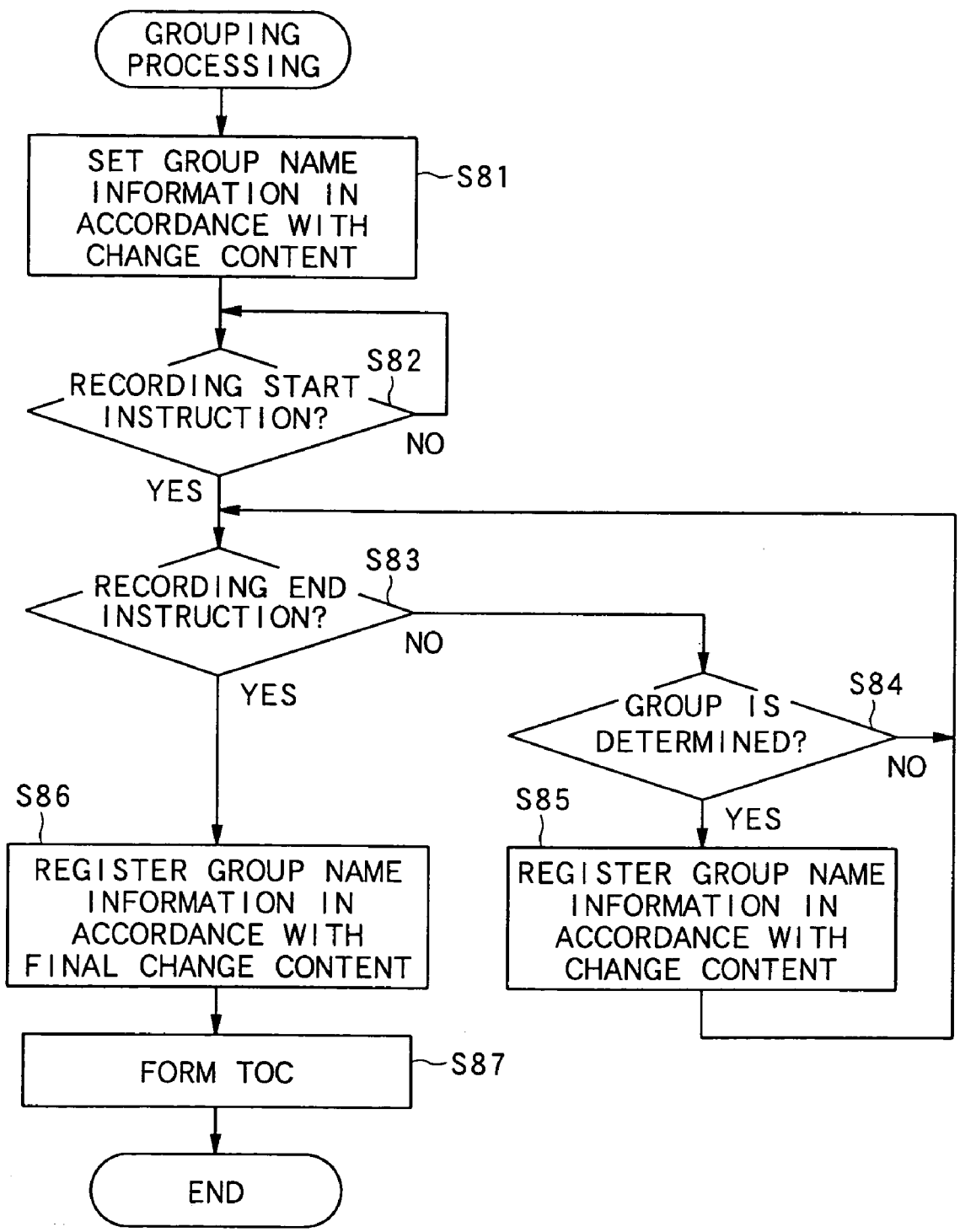
FIG. 9 is a flowchart showing a grouping information adding processing.

Although description was made for the grouping for each case in the first embodiment, the foregoing grouping processing is integrated in the actual grouping operation. Accordingly, in this embodiment, a grouping information adding processing is performed to clarify that in which case the grouping has been performed. The grouping information adding processing of the embodiment is executed by the CPU 51a of the system controller 51. A grouping information adding processing program is stored in the ROM 51b. The grouping information adding processing will be described with reference to FIG. 9 as follows. FIG. 9 is a flowchart showing the grouping information adding processing.

In the grouping information adding processing of FIG. 9, the user firstly operates the input unit 52 to set the group name information in accordance with the change content detected (step S81). Then, when the tune (track) recording starts (step S82), the CPU 51a determines whether there is the instruction to end the tune (track) recording (step S83). When there is no instruction to end the recording, the CPU 51a concludes whether the grouping has been performed (step S84).

When it is determined that the grouping was performed and the group was determined, the group name information in accordance with the change content is registered (attached) with the group (TNO of the tune (track) that belongs to the group)(step S85). Such a processing is performed until the instruction to end the recording is made, and the group name information in accordance with the detected change content is attached to the TNO every time the grouping is performed. For example, when the change of the recording source is detected in step S74 of FIG. 8, in other words, when it is detected that the change of the recording source from the CD to the FM has been made, the CD group is determined (step S77 of FIG. 8), and the group name information called "CD" is registered with the group. And then, when there is the instruction to end the recording (step S83), the CPU 51*a* detects it to register the group name information in accordance with the final change content (step S86), and forms the TOC to end the processing Accordingly, in the grouping information adding processing, the group name information (registered by the user) in accordance with the detected change content is attached to the TNO of the track that belongs to the group.

As described, according to this embodiment, since the grouping is automatically performed in accordance with any kind of change regarding the track recording when recording the tune (track), the user may only enter the group name information, the user can omit the operation that he/she performs the grouping by himself/herself, and thus the operation load of the user can be reduced. Moreover, the group name information in accordance with the detected change content can be automatically attached to the TNO, the user does not need to enter the group name information each time, and thus the operation load of the user can be reduced.

It is to be noted that, in step S81, the constitution can be made such that the user does not register the group name information, but the CUP 51*a* reads out the name (CD, for example) from the input signal to register it with the TNO. In this case, there is the possibility that the same names are read out or the name read out from the input signal and intended to be registered is already recorded in the magnetic optical disc 20. In such cases, the constitution may be made such that a part of the name can be changed by attaching a sub-number such as "CD-1" and "CD-2" and the name is registered.

It is to be noted that in the first embodiment and the second embodiment, description was made for the case where the information recording device of the present invention is applied to the magnetic optical disc recording and replaying device. However, the present invention can be also applied to the recording and replaying device for an information recording medium such as the MD, the CD, the DVD and the LD, an integrated audio device in which a plurality of the information storage media can be used, an audio device installed in a car and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosures of Japanese Patent Application No. 2000-357769 filed on Nov. 24, 2000, Japanese Patent Application No. 2000-357772 filed on Nov. 24, 2000, and Japanese Patent Application No. 2000-357773 filed on Nov. 24, 2000 including the specification, claims, diagrams and summary is incorporated herein by reference in its entirety.

What is claimed is:

1. An information recording apparatus that comprises:
a recording device for recording information for each track, said each track being a minimum unit which is designated at the time of reproducing the information;
an information attaching and generating device, which attaches track number information to each track recorded in an information recording medium and generates group control information to control one or a plurality of tracks as one group;
an inputting operation device for performing an inputting operation in accordance with a user's instruction; and
a detection device for giving a grouping instruction to said information attaching and generating device at the time when the inputting operation relating to an interruption of a recording is detected while the recording is being performed,
wherein, if the inputting operation relating to the interruption is detected while a recording for a track is in progress, said recording device interrupts a recording after finishing said recording of said track, and if the inputting operation relating to the interruption is detected after a recording for a track is finished, said recording device interrupts a recording when the interruption inputting operation is detected,
said information attaching and generating device generates the group control information to control one or a plurality of tracks as one group when said grouping instruction is received, said one group being constituted of one or a plurality of tracks recorded during a period from a start of the recording to an interruption of the recording, and
said information attaching and generating device updates the group control information so as to control one or a plurality of tracks as a new group every time said grouping instruction is received.

2. The information recording apparatus according to claim 1, wherein
said detection device gives the grouping instruction to said information attaching and generating device when the inputting operation relating to an end of a recording in said information recording medium is detected, and
said information attaching and generating device generates the group control information to control one or a plurality of tracks as one group when said grouping instruction is received, said one group being constituted of one or a plurality of tracks recorded during a period from a start of the recording to an end of the recording.

3. The information recording apparatus according to claim 2, wherein said information attaching and generating device attaches said track number information to the tracks sequentially recorded from the track where said recording is started in such a manner that the number continuously increases.

4. The information recording apparatus according to claim 1, wherein
said detection device gives the grouping instruction to said information attaching and generating device when the inputting operation relating to a pause of a recording to said information recording medium is detected, and
said information attaching and generating device generates the group control information to control one or a plurality of tracks as one group when said grouping instruction is received, said one group being constituted of one or a plurality of tracks recorded during a period from a start of the recording to an pause of the recording.

5. The information recording apparatus according to claim 4, wherein said information attaching and generating device attaches said track number information to the tracks sequentially recorded from the track where said recording is started in such a manner that the number continuously increases.

6. The information recording apparatus according to claim 5, wherein
said detection device gives the grouping start instruction to said information attaching and generating device when the inputting operation relating to a release of said pause is detected, and
said information attaching and generating device generates the group control information to control one or a plurality of tracks as a new group, said new group being constituted of a track recorded at the point when said grouping start instruction is received and subsequent tracks be a new group.

7. The information recording apparatus according to claim 4, wherein
said detection device gives the grouping start instruction to said information attaching and generating device when the inputting operation relating to a release of said pause is detected, and
said information attaching and generating device generates the group control information to control one or a plurality of tracks as a new group, said new group being constituted of a track recorded at the point when said grouping start instruction is received and subsequent tracks.

8. The information recording apparatus according to claim 1, wherein said detection device gives the grouping instruction to said information attaching and generating device when the inputting operation relating to a change of a recording method to said information recording medium is detected.

9. The information recording device according to claim 8, wherein said information attaching and generating device generates the group control information to control one or a plurality of tracks as a new group, said new group being constituted of a track recorded at the point when said grouping instruction is received and subsequent tracks.

10. The information recording apparatus according to claim 9, wherein said information attaching and generating device attaches said track number information to the tracks sequentially recorded from the track where said recording is started in such a manner that the number continuously increases.

11. The information recording device according to claim 1, wherein said detection device gives the grouping instruction to said information attaching and generating device when a change of an operation state of a device in a recording source is detected.

12. The information recording apparatus according to claim 1, wherein said detection device gives the grouping instruction to said information attaching and generating device when the inputting operation relating to a change of a recording mode in said information recording medium is detected.

13. The information recording apparatus according to claim 12, wherein said information attaching and generating device generates the group control information to control one or a plurality of tracks as a new group, said new group being constituted of a track recorded at the point when said grouping start instruction is received and subsequent tracks.

14. The information recording apparatus according to claim 13, wherein said information attaching and generating device attaches said track number information to the tracks sequentially recorded from the track where said recording is started in such a manner that the number continuously increases.

15. The information recording apparatus according to claim 1, wherein said detection device gives the grouping instruction to said information attaching and generating device when the inputting operation relating to a change of a recording source is detected.

16. The information recording apparatus according to claim 15, wherein said information attaching and generating device generates the group control information to control one or a plurality of tracks as a new group, said new group being constituted of a track recorded at the point when said grouping start instruction is received and subsequent tracks.

17. The information recording apparatus according to claim 16, wherein said information attaching and generating device attaches said track number information to the tracks sequentially recorded from the track where said recording is started in such a manner that the number continuously increases.

18. The information recording apparatus according to claim 17, wherein said information attaching and generating device attaches the track number information in such a manner that said track number information attached to the tracks from the track where said recording is started to the track already recorded at the point when said grouping instruction is received and said track number information attached to the track recorded after said grouping instruction is received are discriminated.

19. The information recording apparatus according to claim 1, further comprising:
a registration device for registering a group information in accordance with content of a change detected by said detection device, wherein said information attaching and generating device further attaches the group information in accordance with the content of said detected change to the track that belongs to said same group.

20. The information recording apparatus according to claim 1, further comprising:
a registration device for reading out information from a recorded track regarding the track and registering the information as a group information, wherein said information attaching and generating device further attaches said group information regarding the track that belongs to said same group to the track that belongs to said same group.

21. The information recording apparatus according to claim 20, wherein said registration device changes said read-out information when said registration device determines that the same information as said read-out information is already registered, and registers said read-out information as the group information after changing said read-out information.

22. The information recording apparatus according to claim 21, wherein said registration device performs registration by adding a change that a sub-number is given to said read-out information.

* * * * *